(12) United States Patent
Feng et al.

(10) Patent No.: US 11,596,014 B2
(45) Date of Patent: Feb. 28, 2023

(54) MULTIMODE BASE STATION AND CORDLESS COMMUNICATION SYSTEM

(71) Applicant: YEALINK (XIAMEN) NETWORK TECHNOLOGY CO., LTD., Fujian (CN)

(72) Inventors: Wanjian Feng, Fujian (CN); Bingyang Zeng, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 6 days.

(21) Appl. No.: 17/314,042

(22) Filed: May 6, 2021

(65) Prior Publication Data

US 2021/0368567 A1 Nov. 25, 2021

(30) Foreign Application Priority Data

May 21, 2020 (CN) .......................... 202010437933.2

(51) Int. Cl.
*H04W 76/15* (2018.01)
*H04W 48/20* (2009.01)
*H04W 88/10* (2009.01)

(52) U.S. Cl.
CPC ........... *H04W 76/15* (2018.02); *H04W 48/20* (2013.01); *H04W 88/10* (2013.01)

(58) Field of Classification Search
CPC ........ H04L 5/14; H04W 88/10; H04W 76/15; H04W 48/20
See application file for complete search history.

(56) References Cited

U.S. PATENT DOCUMENTS

| | | | | |
|---|---|---|---|---|
| 6,188,898 B1* | 2/2001 | Phillips | ................ | H04W 88/08 455/433 |
| 6,456,858 B1* | 9/2002 | Streter | ................ | H04W 88/06 370/332 |
| 7,502,626 B1* | 3/2009 | Lemilainen | ............ | H04L 67/08 370/395.5 |
| 9,521,612 B2* | 12/2016 | Sahu | ..................... | H04W 48/08 |
| 2006/0276165 A1* | 12/2006 | Nakama | ................ | H04W 88/10 455/403 |
| 2007/0066273 A1* | 3/2007 | Laroia | ............... | H04W 52/0206 455/343.2 |

(Continued)

*Primary Examiner* — Hassan A Phillips
*Assistant Examiner* — Prenell P Jones

(57) ABSTRACT

A multimode base station and a system. The multimode base station includes a wireless transceiver module, a first processing module, a second processing module, a selection and configuration module, and a network connection module. The first processing module is connected to the wireless transceiver module. The second processing module is connected to the network connection module. The first processing module is connected to the second processing module. The multimode base station operates in base mode, DM mode, or dual mode. The selection and configuration module is configured to receive a mode setting instruction from a user, and set an operating mode of the multimode base station. The multimode base station in base mode is equivalent to a base station. The multimode base station in DM mode is equivalent to a DECT manager. The multimode base station in dual mode is equivalent to a base station and a DECT manager.

10 Claims, 3 Drawing Sheets

(56) References Cited

U.S. PATENT DOCUMENTS

| | | | |
|---|---|---|---|
| 2007/0066329 A1* | 3/2007 | Laroia | H04L 5/0053 |
| | | | 455/502 |
| 2009/0279565 A1* | 11/2009 | Kamath | H04B 7/2643 |
| | | | 370/442 |
| 2016/0014642 A1* | 1/2016 | Liang | H04W 36/0022 |
| | | | 370/331 |
| 2016/0112881 A1* | 4/2016 | Duan | H04W 16/18 |
| | | | 455/422.1 |
| 2018/0092007 A1* | 3/2018 | Ekici | H04W 36/0066 |
| 2020/0014523 A1* | 1/2020 | Huang | H04L 5/001 |
| 2021/0080580 A1* | 3/2021 | Tsvelykh | G01S 17/58 |

* cited by examiner

MULTIMODE BASE STATION AND CORDLESS COMMUNICATION SYSTEM

CROSS-REFERENCE TO RELATED APPLICATIONS

The present application claims the benefit of Chinese Patent Application No. 202010437933.2 filed on May 21, 2020, the contents of which are hereby incorporated by reference.

TECHNICAL FIELD

The present disclosure relates to the technical field of communications, and in particular, to a multimode base station and a cordless communication system.

BACKGROUND

An existing cordless communication system typically includes a base (wireless base station), a device monitor (DM, which is a digitally enhanced cordless telecommunications (DECT) manager responsible for system composition, content distribution, etc. and functions as a central server), and a handset (wireless mobile device). The quantity of wireless mobile devices that can register with a base station is limited because of the limited coverage of the single base station. This cannot meet enterprise users' needs. Therefore, it is urgent to expand coverage of the base station and increase the quantity of wireless mobile devices.

In existing technical solutions, one central server and a plurality of base stations are typically deployed. The central server manages the plurality of base stations. To be specific, the base stations are connected to a Voice over Internet Protocol (VoIP) network through the central server. In other words, the base stations need to use the central server to control incoming/outgoing calls made by a plurality of wireless mobile phones.

However, in existing cordless communication systems, base stations are separated from DECT managers, and the functions of the base stations are independent of those of the DECT managers. Therefore, users need to purchase both base stations and DECT managers to construct cordless communication systems. In addition, the users need to purchase matched DECT managers if the DECT managers in the cordless communication systems are damaged. Such a replacement method is inflexible and inconvenient.

SUMMARY

Embodiments of the present disclosure provide a multimode base station and a cordless communication system. The multimode base station has functions of both a base station and a DECT manager, thereby resolving the problem of a limited and inconvenient method for replacing a DECT manager in an existing cordless communication system.

An embodiment of the present disclosure provides a multimode base station, including a wireless transceiver module, a first processing module, a second processing module, a selection and configuration module, and a network connection module. The first processing module is connected to the wireless transceiver module. The second processing module is connected to the network connection module. The first processing module is connected to the second processing module. The multimode base station can operate in base mode or DM mode.

The selection and configuration module is configured to receive a mode setting instruction from a user and set an operating mode of the multimode base station.

When the multimode base station is in base mode, the wireless transceiver module is configured to receive a call request initiated by a communication terminal, and transmit the call request to the first processing module, so that the first processing module transmits the call request to the second processing module. The second processing module is configured to transmit the call request to the multimode base station in DM mode through the network connection module when receiving the call request.

When the multimode base station is in DM mode, the wireless transceiver module and the first processing module do not operate. The network connection module is configured to receive a second call request sent by a multimode base station in base mode, and transmit the second call request to the second processing module, so that the second processing module initiates a call to a called communication terminal of the second call request through the network connection module when receiving the second call request.

Further, the multimode base station may alternatively operate in dual mode. When the multimode base station is in dual mode, the wireless transceiver module is configured to receive a third call request initiated by a communication terminal, and transmit the third call request to the first processing module, so that the first processing module transmits the third call request to the second processing module. The second processing module is configured to initiate a call to a called communication terminal of the third call request through the network connection module when receiving the third call request.

Further, when the multimode base station is in dual mode, the network connection module is further configured to receive a fourth call request sent by a multimode base station in base mode, and transmit the fourth call request to the second processing module, so that the second processing module initiates a call to a called communication terminal of the fourth call request through the network connection module when receiving the fourth call request.

Further, when the multimode base station is in base mode, the wireless transceiver module is further configured to receive a base station switch request initiated by a communication terminal, and transmit the base station switch request to the second processing module;

the second processing module is further configured to send the base station switch request to a multimode base station in DM mode or dual mode through the network connection module after receiving the base station switch request, so that after receiving the base station switch request, the multimode base station in DM mode or dual mode switches a current call of the communication terminal from a second multimode base station to the multimode base station receiving the base station switch request, where the second multimode base station is a multimode base station connected to the communication terminal before the switching.

Further, when the multimode base station is in dual mode, the wireless transceiver module is further configured to receive a base station switch request initiated by a communication terminal, and transmit the base station switch request to the second processing module;

the second processing module is further configured to, after receiving the base station switch request, switch a current call of the communication terminal from a second multimode base station to the multimode base station including the second processing module, where the second multimode base station is a multimode base station connected to the communication terminal before the switching.

Based on the foregoing embodiments, the present disclosure correspondingly provides another embodiment. The another embodiment of the present disclosure provides a cordless communication system, including several multimode base stations described in the foregoing embodiments and several wireless communication terminals. At least one of the several multimode base stations is in DM mode or dual mode.

The embodiments of the present disclosure have the following beneficial effects:

The embodiments of the present disclosure provide a multimode base station and a cordless communication system. The multimode base station has a plurality of operating modes. The multimode base station in base mode is equivalent to a common base station, and is mainly configured to receive call requests of communication terminals, and forward the call request to a multimode base station in DM mode or dual mode. The multimode base station in DM mode is equivalent to a DECT manager responsible for connecting to a VoIP network and establishing a call connection with a called communication terminal through the VoIP network after receiving the call request. The multimode base station in dual mode is equivalent to a base station and a DECT manager, and can not only directly receive a request sent by a wireless communication terminal, but also establish a communicative connection with a called wireless communication terminal through the VoIP network. Using the multimode base station provided in the present disclosure to construct a cordless communication system, the user only needs to purchase one type of device, and then set one of the devices to DM mode or dual mode and other devices to base mode. If the multimode base station serving as a DECT manager (that is, the multimode base station in DM mode or dual mode) is damaged, the user can directly select any one of other multimode base stations and set the selected base station to DM mode or dual mode to ensure normal operation of the entire cordless communication system. In this way, more diverse and convenient methods are available for replacing the DECT manager in the entire system.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
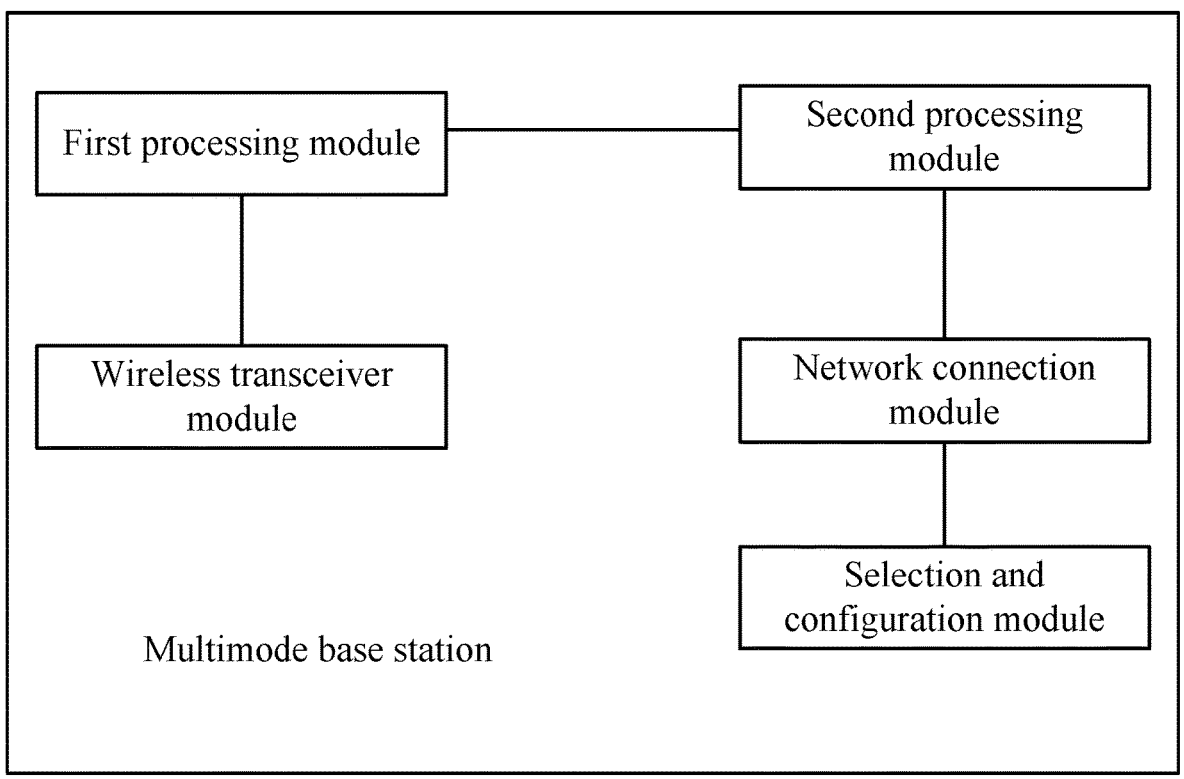
FIG. 1 is a schematic structural diagram of a multimode base station according to an embodiment of the present disclosure.

As shown in FIG. 1, an embodiment of the present disclosure provides a multimode base station, including a wireless transceiver module, a first processing module, a second processing module, a selection and configuration module, and a network connection module. The first processing module is connected to the wireless transceiver module. The second processing module is connected to the network connection module. The first processing module is connected to the second processing module. The multimode base station can operate in base mode or DM mode.

The selection and configuration module is configured to receive a mode setting instruction from a user, and set an operating mode of the multimode base station.

When the multimode base station is in base mode, the wireless transceiver module is configured to receive a call request initiated by a communication terminal and transmit the call request to the first processing module, so that the first processing module transmits the call request to the second processing module. The second processing module is configured to transmit the call request to a network connection module of a multimode base station in DM mode through the network connection module when receiving the call request.

When the multimode base station is in DM mode, the wireless transceiver module and the first processing module do not operate. The network connection module is configured to receive a second call request sent by a multimode base station in base mode, and transmit the second call request to the second processing module, so that the second processing module initiates a call to a called communication terminal of the second call request through the network connection module when receiving the second call request.

When the multimode base station is in dual mode, the wireless transceiver module is configured to receive a third call request initiated by a communication terminal, and transmit the third call request to the first processing module, so that the first processing module transmits the third call request to the second processing module. The second processing module is configured to initiate a call to a called communication terminal of the third call request through the network connection module when receiving the third call request.

In a preferred embodiment, the communication terminal mentioned in the present disclosure is a wireless communication terminal.

It should be noted that in the present disclosure, the base station in base mode is communicatively connected to the base station in DM mode through a network module, and they communicate with each other through an RPCKit network. The base station in DM mode communicates with the called communication terminal through a VoIP network. That is, in this embodiment, there are two operating modes of the multimode base station: DM mode and base mode. The multimode base station in base mode is equivalent to a conventional wireless base station. The wireless transceiver module receives a call request initiated by a calling communication terminal, and then the network connection module sends the call request to the multimode base station in DM mode. In this case, the base station in base mode communicates with the base station in DM mode through the RPCKit network.

The call request received by the multimode base station in DM mode is first processed by the second processing module. The second processing module transmits the processed call request back to the network connection module. Then the network connection module establishes a call connection with the called communication terminal through the VoIP network.

In a preferred embodiment, the multimode base station may alternatively operate in dual mode. When the multimode base station is in dual mode, the wireless transceiver module is configured to receive a third call request initiated by a communication terminal, and transmit the third call request to the first processing module, so that the first processing module transmits the third call request to the second processing module. The second processing module is configured to initiate a call to a called communication terminal of the third call request through the network connection module when receiving the third call request.

In this embodiment, the multimode base station is in dual mode and has both base mode functions and DM mode functions. After the wireless transceiver module receives the call request of the communication terminal, the second processing module processes the call request and then transmits the processed call request to the network connection module. The network connection module establishes a connection with the called communication terminal.

Preferably, when the multimode base station is in dual mode, the network connection module is further configured to receive a fourth call request sent by a multimode base station in base mode, and transmit the fourth call request to the second processing module, so that the second processing module connects to the VoIP network through the network connection module and initiates a call to a called wireless communication terminal of the fourth call request through the VoIP network when receiving the fourth call request. In this embodiment, the base station in dual mode does not directly receive the call request initiated by the calling communication terminal, but instead receives the call request forwarded by the base station in base mode. In this case, the base station in dual mode operates in the same way as the multimode base station in DM mode.

In the present disclosure, the multimode base station has two processing modules. The first processing module is configured to implement data reception and transmission functions of a common base station. The second processing module is configured to implement functions of a common DECT manager.

Specifically, a user obtains a corresponding registered SIP phone account after registering a to-be-used wireless communication terminal to the multimode base station. The wireless communication terminal initiates a call by this account. It should be noted that after the user registers the SIP phone account on the multimode base station, set account information is transmitted to the second processing module of the multimode base station through the network connection module of the multimode base station. The second processing module stores and distributes the account information.

Each wireless communication terminal has a MAC address. The wireless communication terminals are used to initiate registration requests including the MAC addresses to the multimode base station. After receiving the registration requests, the multimode base station feeds back verification information, for example, information that instructs to enter registration passwords, to the wireless communication terminals. After the verification succeeds, matching is completed, and connections are established between the multimode base station and the wireless communication terminals. In addition, SIP phone accounts are assigned to the wireless communication terminals.

A cordless communication system includes one base station in dual mode or DM mode and a plurality of multimode base stations in base mode. If any multimode base station is selected, the selection and configuration module sets the operating mode of the multimode base station to dual mode or DM mode, and sets operating modes of other multimode base stations to base mode. It should be noted that the mode setting is performed on a management platform corresponding to the device. The user selects an operating mode of the multimode base station on the management platform, which generates a setting instruction that is sent to the network connection module of the multimode base station. The network connection module transmits the mode setting instruction to the selection and configuration module. The selection and configuration module sets the operating mode of the multimode base station. The mode setting may be alternatively implemented through system update of the multimode base station. The user can download a ROM package of a corresponding mode from the corresponding management platform. The multimode base station can switch between different modes after completing the ROM package upgrade.

In a period of use, the user binds the multimode base stations in base mode and the multimode base station in dual mode or DM mode through registration, which generates registration instructions. The registration instructions are sent to the network connection module of the multimode base station in dual mode or DM mode, and include IP addresses of the multimode base stations in base mode. Then the network connection module transmits the registration instructions to the second processing module of the multimode base station in dual mode or DM mode. The second processing module establishes connections with other multimode base stations in base mode.

After the construction of the entire cordless communication system is completed, the multimode base station in base mode receives a call request initiated by a wireless communication terminal. The call request includes the number of a called wireless communication terminal and the number of the calling wireless communication terminal. Then the multimode base station in base mode sends the call request to the multimode base station in dual mode or DM mode through the network connection module. The network connection module of the multimode base station in dual mode or DM mode receives the call request and transmits the call request to the second processing module of the multimode base station in dual mode or DM mode. The second processing module receives the call request and then establishes a connection between the calling wireless communication terminal and the called wireless communication terminal based on the number of the calling wireless communication terminal and the number of the called wireless communication terminal in the call request through the VoIP network connected to the network connection module.

The multimode base station in base mode is equivalent to a common base station, and is mainly configured to receive call requests initiated by the wireless communication terminals and forward the call requests to the multimode base station in DM mode or dual mode.

The multimode base station in DM mode is equivalent to a DECT manager for call management.

The multimode base station in dual mode is equivalent to a base station and a DECT manager. On the one hand, it can directly receive the request sent by the wireless communication terminal like a common base station. On the other hand, it can establish a communicative connection between the calling wireless communication terminal and the called wireless communication terminal through the VoIP network like a DECT manager.

In a preferred embodiment, when the multimode base station is in base mode, the wireless transceiver module is further configured to receive a base station switch request initiated by a communication terminal, and transmit the base station switch request to the second processing module. The second processing module is further configured to send the base station switch request to the multimode base station in DM mode or dual mode through the network connection module after receiving the base station switch request, so that after receiving the switch request, the multimode base station in DM mode or dual mode switches a current call of the communication terminal from a second multimode base station to the multimode base station receiving the base station switch request. The second multimode base station is a multimode base station connected to the communication terminal before the switching.

During an actual call, a wireless communication terminal may move, whereas a signal reception range of a multimode base station is limited. It is assumed that the wireless communication terminal is currently connected to a base-mode base station numbered 1. When the wireless communication terminal moves beyond the signal reception range of the base-mode base station numbered 1 and enters the signal reception range of a base-mode base station numbered 2, the wireless communication terminal may send a base station switch request to the base-mode base station numbered 2. The base station switch request includes the IP address of the base-mode base station numbered 1, the number of the calling wireless communication terminal, and the number of the called wireless communication terminal. After receiving the request, the base-mode base station numbered 2 processes the base station switch request and adds its own IP address, that is, the IP address of the base-mode base station numbered 2, and then transmits the request to the multimode base station in DM mode or dual mode through the network connection module. After the multimode base station in DM mode or base mode receives the base station switch request, the second processing module of the multimode base station in DM mode or base mode switches the call between the communication terminal and the base-mode base station numbered 1 to the base-mode base station numbered 2 based on the IP address of the base-mode base station numbered 1, the number of the calling wireless communication terminal, the number of the called wireless communication terminal, and the IP address of the base-mode base station numbered 2.

In a preferred embodiment, when the multimode base station is in dual mode, the wireless transceiver module is further configured to receive a base station switch request initiated by a communication terminal, and transmit the base station switch request to the second processing module. The second processing module is further configured to, after receiving the base station switch request, switch a current call of the communication terminal from a second multimode base station to the multimode base station including the second processing module. The second multimode base station is a multimode base station connected to the communication terminal before the switching. In this embodiment, the multimode base station in dual mode has a call processing capability. Therefore, it can directly switch the call to itself based on the call switch request, which is processed by its second processing module.

Figure 2:
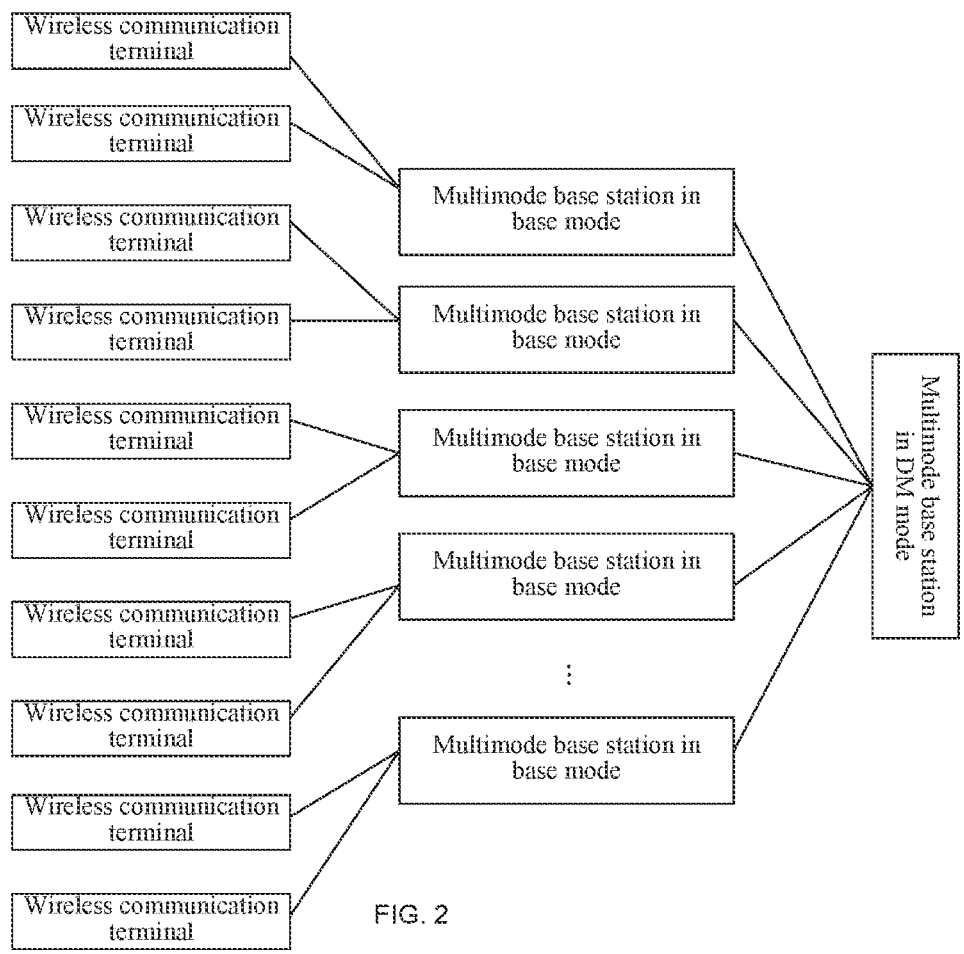
FIG. 2 is an architecture diagram of a cordless communication system according to an embodiment of the present disclosure.
Figure 3:
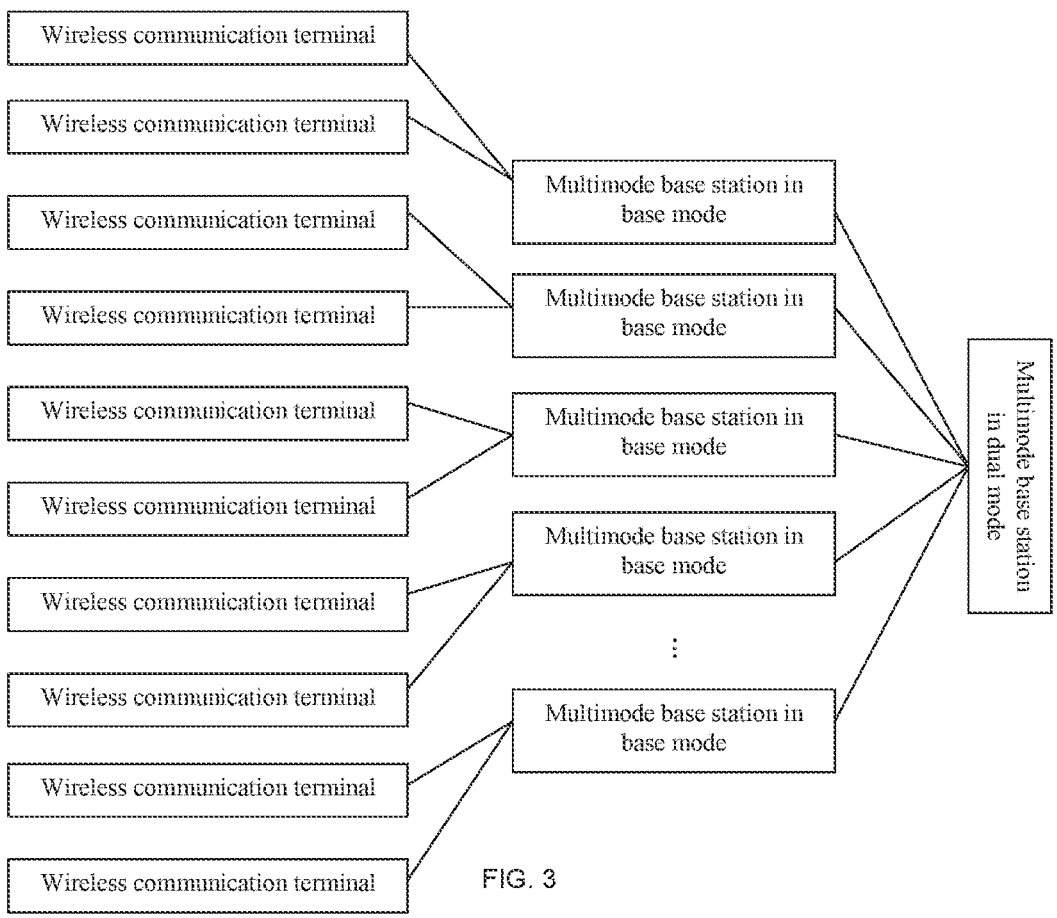
FIG. 3 is an architecture diagram of another cordless communication system according to an embodiment of the present disclosure.

As shown in FIG. 2 and FIG. 3, based on the foregoing embodiments, the present disclosure correspondingly provides a cordless communication system. The system includes several multimode base stations described in any one of the foregoing embodiments of the present disclosure and several wireless communication terminals. At least one of several multimode base stations is in DM mode or dual mode.

FIG. 2 shows a cordless communication system including one multimode base station in DM mode, several multimode base stations in base mode, and several wireless communication terminals.

FIG. 3 shows a cordless communication system including one multimode base station in dual mode, several multimode base stations in base mode, and several wireless communication terminals.

In another preferred embodiment, the wireless transceiver module, the first processing module, the second processing module, the selection and configuration module, and the network connection module in the multimode base station provided in the foregoing embodiment may all be processors or control chips.

According to the embodiments of the present disclosure, when constructing a cordless communication system, a user only needs to purchase one type of device, and then set one of the devices to DM mode or dual mode and other devices to base mode. If the multimode base station serving as a DECT manager (that is, the multimode base station in DM mode or dual mode) is damaged, the user can directly select any one of other multimode base stations and set the selected base station to DM mode or dual mode to ensure normal operation of the entire cordless communication system. In this way, more diverse and convenient methods are available for replacing the DECT manager in the entire system.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A multimode base station, comprising: a wireless transceiver module, a first processing module, a second processing module, a selection and configuration module, and a network connection module, wherein the first processing module is connected to the wireless transceiver module, the second processing module is connected to the network connection module, the first processing module is connected to the second processing module, and the multimode base station can operate in base mode or device monitor (DM) mode;

the selection and configuration module is configured to receive a mode setting instruction from a user and set an operating mode of the multimode base station;

when the multimode base station is in base mode, the wireless transceiver module is configured to receive a call request initiated by a communication terminal, and transmit the call request to the first processing module, so that the first processing module transmits the call request to the second processing module; the second processing module is configured to transmit the call request to the multimode base station in DM mode through the network connection module when receiving the call request; and when the multimode base station is in DM mode, the wireless transceiver module and the first processing module do not operate; and the network connection module is configured to receive a second call request sent by a multimode base station in base mode, and transmit the second call request to the second processing module, so that the second processing module initiates a call to a called communication terminal of the second call request through the network connection module when receiving the second call request.

2. The multimode base station according to claim 1, wherein the multimode base station can alternatively operate in dual mode; and when the multimode base station is in dual mode, the wireless transceiver module is configured to receive a third call request initiated by a communication terminal, and transmit the third call request to the first processing module, so that the first processing module transmits the third call request to the second processing module; and the second processing module is configured to initiate a call to a called communication terminal of the third call request through the network connection module when receiving the third call request.

3. The multimode base station according to claim 2, wherein when the multimode base station is in dual mode, the network connection module is further configured to receive a fourth call request sent by a multimode base station in base mode, and transmit the fourth call request to the second processing module, so that the second processing module initiates a call to a called communication terminal of the fourth call request through the network connection module when receiving the fourth call request.

4. The multimode base station according to claim 1, wherein when the multimode base station is in base mode, the wireless transceiver module is further configured to receive a base station switch request initiated by a communication terminal, and transmit the base station switch request to the second processing module; and the second processing module is further configured to send the base station switch request to a multimode base station in DM mode or dual mode through the network connection module after receiving the base station switch request, so that after receiving the switch request, the multimode base station in DM mode or dual mode switches a current call of the communication terminal from a second multimode base station to the multimode base station receiving the base station switch request, wherein the second multimode base station is a multimode base station connected to the communication terminal before the switching.

5. The multimode base station according to claim 2, wherein when the multimode base station is in dual mode, the wireless transceiver module is further configured to receive a base station switch request initiated by a communication terminal, and transmit the base station switch request to the second processing module; and the second processing module is further configured to, after receiving the base station switch request, switch a current call of the communication terminal from a second multimode base station to the multimode base station comprising the second processing module, wherein the second multimode base station is a multimode base station connected to the communication terminal before the switching.

6. A cordless communication system, comprising several multimode base stations according to claim 1 and several wireless communication terminals, wherein at least one of the several multimode base stations operates in DM mode or dual mode.

7. A cordless communication system, comprising several multimode base stations according to claim 2 and several wireless communication terminals, wherein at least one of the several multimode base stations operates in DM mode or dual mode.

8. A cordless communication system, comprising several multimode base stations according to claim 3 and several wireless communication terminals, wherein at least one of the several multimode base stations operates in DM mode or dual mode.

9. A cordless communication system, comprising several multimode base stations according to claim 4 and several wireless communication terminals, wherein at least one of the several multimode base stations operates in DM mode or dual mode.

10. A cordless communication system, comprising several multimode base stations according to claim 5 and several wireless communication terminals, wherein at least one of the several multimode base stations operates in DM mode or dual mode.

* * * * *